Figure 1:
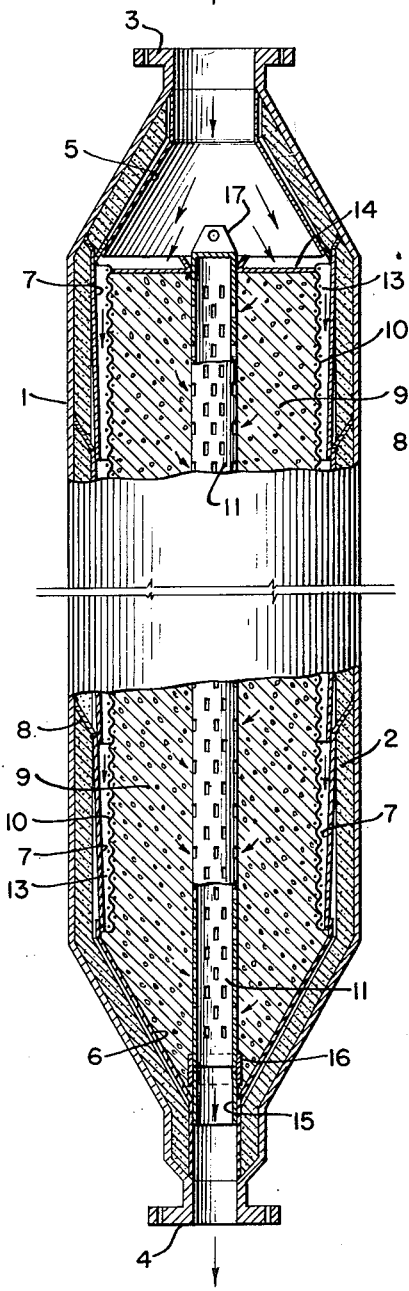

July 13, 1954     D. J. BERGMAN     2,683,654

INTERNALLY INSULATED AND LINED REACTOR

Filed Jan. 25, 1952

INVENTOR:
DONALD J. BERGMAN

BY:
Chester J. Giuliani
Philip T. Liggett

ATTORNEYS:

Patented July 13, 1954

2,683,654

UNITED STATES PATENT OFFICE 2,683,654

INTERNALLY INSULATED AND LINED REACTOR

Donald J. Bergman, Kenilworth, Ill., assignor to Universal Oil Products Company, Chicago, Ill., a corporation of Delaware Application January 25, 1952, Serial No. 268,320

1 Claim. (Cl. 23—288)

This invention relates to an improved internally insulated and lined reactor chamber which is adapted to hold a bed of catalyst or other subdivided contact material and to accommodate high temperature conversion conditions.

There are various methods for lining processing chambers and reactors to provide protection against high temperatures, erosion, corrosion, etc., such as encountered in the chemical and petroleum processing fields. However, the usual lined reactor does not provide an internal refractory insulating material in combination with a segmental type of liner of alloy or other suitable material which is adapted to prevent hydrogen attack on an outer pressure retaining chamber, as well as stop fluid channelling in the softer insulating material.

Carbon steel is permeable to hydrogen, particularly at high temperatures, so that for reactor chambers fabricated of carbon steel which are to be utilized for high pressure and high temperature reactant streams having hydrogen present, it is desirable to provide internal insulation which keeps the wall temperature below that at which hydrogen attack may occur. It is also desirable to provide a vapor stop means at spaced distances in the insulating material in order to prevent hydrogen or other gases and vapors from channelling therethrough.

Briefly, the improved lined reactor of the present invention comprises in combination, a pressure-tight outer chamber having a fluid opening at each end thereof, a refractory insulating material attached to the inside of the outer chamber, a segmental liner within the chamber and spaced slightly from the refractory insulating material, said liner having separate end sections and a plurality of intermediate sections, each of the end sections being rigidly supported from the chamber and communicating with a fluid opening at one end thereof, each of the intermediate sections having a tubular body portion and a continuous tapered frusto-conical supporting portion having its outer and larger edge sealed to the inside wall of the outer chamber, with an unsupported free end of each body portion of each intermediate section lapping a next adjacent intermediate section and providing a liner adapted to accommodate longitudinal and peripheral temperature expansions.

Preferably, the frusto-conical portion is at a slant or angle providing a considerable length thereto and so that a minimum amount of heat is carried to the outer chamber wall. This slanting portion for supporting the main body portion of each intermediate section is of particular advantage in that it accommodates differential temperature expansions with less buckling or warping than a substantially flat annular section. For example, in a high temperature conversion operation, the internal portion of the reactor and the liner may be subjected to temperatures of the order of 900° F. or more and the outer chamber wall maintained at a temperature of say less than 250° F. by reason of the internal insulation. This means that the inner periphery of the frusto-conical section which attaches to the body portion of said liner section is at the 900° F. temperature, while the outer periphery approximates the 250° F. temperature of the outer chamber wall. An annular ring subjected to this temperature gradient in a relatively narrow space would necessarily buckle and warp and may be overstressed or be torn loose from either the chamber wall or the body portion of the lining member. On the other hand, the slanting and frusto-conical portion permits a longitudinal temperature gradient therethrough which is relatively low per increment of length, and allows a more natural expansion or deflection due to temperature differences and the elimination of excessive discontinuity stresses.

It is also a feature of the present design to utilize a slanting frusto-conical supporting portion which is non-perforate in order that it provide a gas or vapor stop and prevent the channelling of gaseous or liquid streams through the insulating material. The operating pressure within the reactor liner will also be maintained in the insulating material, between the outer chamber and the liner, due to the various slip joints of the segmental liner. However, there will be no actual longitudinal flow of the reactant stream or channelling of a portion thereof between the liner and the outer chamber because of the sealing of each slanting supporting section to the inside wall of the chamber. Further, since the liner sections do not accommodate a pressure differential, they may be made relatively thin, being only of such thickness as is necessary to support themselves and maintain a bed of contact material therein.

The construction and arrangement of the present improved lined and insulated reactor, as well as additional advantages and features in connection therewith, will be more apparent upon reference to the accompanying drawing and the following description thereof.

Figure 1 of the drawing is a sectional elevational view of one embodiment of the improved liner construction, as used in connection with a reactor designed and arranged to have radial flow of the reactant stream through a contact bed.

Figure 2:
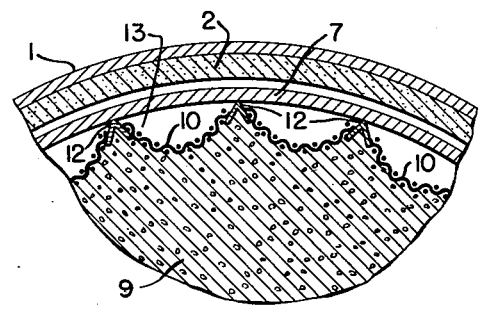
Figure 3:
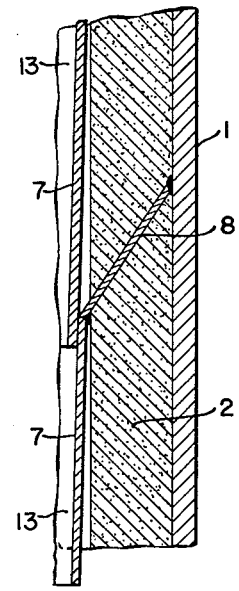

Figure 2 of the drawing is an enlarged sectional plan view through a segment of the wall of the reactor chamber of Figure 1, while Figure 3 is an enlarged elevational section of a segment of the outer wall and lining of the reactor chamber.

Referring now to the drawing, there is indicated a vertically positioned outer chamber or shell 1 having an inner refractory insulating material 2. This insulation may be an insulating type of concrete applied over rods, wire mesh, or the like, which in turn is welded or otherwise connected to the inside wall of chamber 1. The upper and lower ends of chamber 1 are provided, respectively, with suitable flanged openings or ports 3 and 4. In the drawing, the upper port 3 is indicated by the arrows as being a reactant stream inlet, while the lower port 4 is indicated as a product stream outlet, however, it is not intended to limit the use of the reactor of the present invention to any predetermined fluid flow, for alternatively the flow may be upwardly through the reactor and out the port opening 3.

Internally within the reactor, and inside of the insulating material 2, is a liner comprising upper and lower end sections 5 and 6 respectively, and a plurality of intermediate sections 7. Each of the end sections are welded or otherwise rigidly connected and sealed to the ends of the chamber so that any temperature expansion provides an internal longitudinal movement. Each of these sections 5 and 6 are also preferably spaced a slight distance away from the refractory insulating material 2 within each of the end portions of the chamber, so as to provide for circumferential expansion.

Each of the intermediate liner sections 7 has a slanting frusto-conical portion 8 extending through the insulating material 2 to the inside wall of the chamber 1 where it is welded or otherwise rigidly sealed and connected to the wall. These supporting portions 8 are also welded or otherwise connected to the upper edge of each of the liner body portions, so that they provide vapor stops at vertically spaced distances through the insulating material 2 and prevent channelling of gases or vapors from the reactant stream. The lower and unsupported end of each body section 7 preferably laps over the upper portion of a next adjacent liner section so as to provide a shingled type of surface. The liner sections, as noted hereinbefore, need not be of any great thickness since they do not have to accommodate a high pressure or differential pressure. In other words, the internal pressure of the reactor exists between the liner and the outer chamber wall 1 because of the lap type of construction and substantially the same pressure is existing behind the liner as interiorly thereof. Similarly, the frusto-conical sections particularly may be made relatively thin, since they do not withstand differential pressure conditions. These sections are also preferably made long and thin in order to insure that they transmit only a minimum amount of heat to the outer wall of the chamber 1. By the use of the insulating material 2 and the prevention of the transfer of any substantial amount of heat to the outer chamber wall 1, the latter may be fabricated of carbon steel and operated at a temperature below that at which hydrogen attack may occur. Further, as noted briefly hereinbefore, the relatively long slanting form of the frusto-conical portion 8 permits its accommodation to differential temperature without excessive buckling or warping, or failure due to excessive discontinuity stresses.

As better shown in Figure 3 of the drawing, the liner body portions 7 are preferably spaced a slight distance from the insulating material 2, in order that the liner sections 7 may expand longitudinally and radially within the circumscribing insulating material. The use of the slanting conically shaped supporting portions 8 also permits temperature expansions to be directed downwardly away from the outer chamber wall 1, with a minimum amount of interference with the insulating material.

The particular reactor embodiment shown and described in the drawing is arranged and constructed to maintain a bed of catalyst 9 between a longitudinal screening member or members 10 and a centrally positioned fluid collecting or distributing conduit 11. As is better shown in Figure 2 of the drawing, the longitudinal screening 10 comprises a plurality of arched or convex sections which are removably held between a plurality of V shaped strips or clip members 12. The arched screening thus provides unobstructed spaces 13 adjacent the liner sections 7 and extending for substantially the full height of the liner. The screening members 10 may be formed of screen, wire cloth, or perforated metal sheeting which is suitable to hold the catalyst or other type of contact material away from the liner wall and permit fluid flow longitudinally through the unobstructed spaces 13 with little or no pressure drop. The centrally positioned fluid conduit 11 has a plurality of slots or perforations which likewise prevent the passage of catalyst or contact material therethrough, but permit fluid flow to or from the longitudinal conduit, for substantially the full height thereof. Thus, there is provided means for obtaining a uniform radial flow for the full height of the contacted bed.

In the present embodiment, arrows indicate a fluid or gaseous flow to be downward through the opening 3 and into the longitudinal space around screening members 10, and from the latter radially through the contact bed 9 into the fluid conduit 11, from which it passes downwardly and outwardly through opening 4. However, the flow may be in the reverse manner, the fluid flow being upwardly through conduit 11, outwardly from the latter in a radial manner to the fluid space 13, adjacent the liner wall, and from the spaces 13 upwardly and outwardly from the chamber opening 3. A non-perforate plate member 14 is placed on the upper surface of the contact material 9, between the conduit 11 and the screening members 10, in order that there is no longitudinal flow through the contact material.

In a preferable arrangement and construction, the fluid conduit 11 is removable from the reactor, being held in position by a supporting sleeve member 15, which in turn is connected to the inside of the bottom end liner section 6. The sleeve member 15 has a band or ring member 16 extending around its upper end to provide a seat for the lower end of the fluid conduit 11, so that the latter may be pulled vertically upwardly by means of the bail or lift member 17 at the upper end of the conduit. It should be noted, that the lifting of the fluid conduit 11 permits the contact material of bed 9 to flow out of the lower end of the chamber through opening 4, where its removal is desired for replacement purposes.

While the foregoing description has been specific to a vertically disposed reactor chamber accommodating sub-divided catalyst or other contacting material, it is of course not intended to limit the present improved construction to the particular arrangement and to radial flow through the contact material. It is, however, intended to provide a segmental internal liner, which may be of alloy metal, or other suitable material for the conditions encountered, and a refractory insulation in combination therewith on the interior of a pressure retaining chamber and the combined liner and insulation protecting the chamber wall from high temperature, hydrogen attack, or the erosive action of a portion of the reactant stream being introduced into the reactor.

I claim as my invention:

A lined reactor comprising in combination, a pressure-tight outer chamber having a fluid opening at each end thereof, a refractory insulating material attached to the inside of said outer chamber, a segmental liner within said chamber and spaced slightly from said refractory insulating material, said liner having a plurality of intermediate sections and separate end sections, each of said end sections rigidly supported from said chamber and communicating with a fluid opening at an end thereof, each of said intermediate sections having a tubular body portion supported within the chamber by a continuous tapered frustoconical supporting portion having its outer and larger periphery connecting and sealed to the inside wall of said outer chamber, and an unsupported free end of each body portion of each intermediate section lapping a next adjacent intermediate section and providing a liner adapted to accommodate longitudinal and peripheral temperature expansions, a longitudinal particle retaining screen positioned a short distance from the inside wall of said liner and forming with the latter an unobstructed fluid space, perforate fluid conduit means extending interiorly from one end of said liner for substantially the full length thereof, and said conduit means and said longitudinal particle retaining screening forming an annular section suitable for holding subdivided contact material and accommodating a radial fluid flow therethrough.

References Cited in the file of this patent

UNITED STATES PATENTS

| Number | Name | Date |
|---|---|---|
| 1,992,470 | Carlstrom | Feb. 26, 1935 |
| 2,315,208 | Kinnaird | Mar. 30, 1943 |
| 2,375,710 | Traxler et al. | May 8, 1945 |